United States Patent
Beaverson et al.

(10) Patent No.: US 11,531,483 B2
(45) Date of Patent: Dec. 20, 2022

(54) DIRECT DATA PLACEMENT

(71) Applicant: ORCA DATA TECHNOLOGY (XI'AN) CO., LTD, Xianyang (CN)

(72) Inventors: Arthur James Beaverson, Boxborough, MA (US); Bang Chang, Cary, NC (US); Ken Chiquoine, Littleton, MA (US)

(73) Assignee: ORCA DATA TECHNOLOGY (XI'AN) CO., LTD, Xianyang (CN)

( * ) Notice: Subject to any disclaimer, the term of this patent is extended or adjusted under 35 U.S.C. 154(b) by 141 days.

(21) Appl. No.: 17/206,695

(22) Filed: Mar. 19, 2021

(65) Prior Publication Data

US 2021/0294511 A1    Sep. 23, 2021

Related U.S. Application Data

(60) Provisional application No. 62/991,638, filed on Mar. 19, 2020.

(51) Int. Cl.
*G06F 3/06* (2006.01)
*H04L 9/06* (2006.01)
*H04L 9/32* (2006.01)

(52) U.S. Cl.
CPC .......... *G06F 3/0644* (2013.01); *G06F 3/061* (2013.01); *G06F 3/067* (2013.01); *H04L 9/0643* (2013.01); *H04L 9/3247* (2013.01)

(58) Field of Classification Search
CPC ........ G06F 3/0644; G06F 3/061; G06F 3/067; G06F 12/00; G06F 13/00
See application file for complete search history.

(56) References Cited

U.S. PATENT DOCUMENTS

| | | | |
|---|---|---|---|
| 6,567,408 B1 * | 5/2003 | Li | H04L 45/302 370/395.31 |
| 9,900,305 B2 * | 2/2018 | Levergood | G06Q 30/02 |
| 2007/0006293 A1 * | 1/2007 | Balakrishnan | H04L 63/145 726/13 |
| 2008/0205313 A1 * | 8/2008 | Thubert | H04W 8/082 370/310 |

* cited by examiner

Primary Examiner — Tuan V Thai
(74) Attorney, Agent, or Firm — MagStone Law, LLP; Enshan Hong (57) ABSTRACT

Aspects of disclosure provide methods, systems, and computer-readable media for direct data displacement. The methods include in view of a write request pertaining to a first object, determining, based on a first signature of the first object, whether an index of a storage system comprises an existing object record pertaining to the first object; and in response to determining that the index of the storage system does not include an existing object record pertaining to the first signature, creating a first object record in the index comprising the first signature and a reference count. The methods further include in response to determining that the index of the storage system includes an existing object record pertaining to the first signature, updating a reference count associated with the first object stored in the existing object.

17 Claims, 6 Drawing Sheets

DIRECT DATA PLACEMENT

CROSS-REFERENCE TO RELATED APPLICATION

This application claims priority to U.S. Provisional Patent Application No. 62/991,638, filed Mar. 19, 2020, the entire contents of which are herein incorporated by reference in their entirety.

TECHNICAL FIELD

The present disclosure relates generally to storage systems, and, more specifically, to direct data placement for storage systems.

BACKGROUND

A storage system typically includes a plurality of nodes connected by a network. Each of the nodes may be equipped with a processor, a memory, and a number of storage devices. The storage devices may include hard disk drives (HDDs), solid-state devices (SSDs), or a combination of both (Hybrid). The storage devices may be configured under a RAID (Redundant Array of Inexpensive Disks) hardware or software for data redundancy and load balancing. The storage devices may be locally attached to each node or shared among multiple nodes. The processor may be dedicated to running storage software or shared between storage software and user applications. Storage software, such as a logical volume manager and a file system, provides storage virtualization and data services such as snapshots and clones.

Storage virtualization may decouple the logical devices addressed by user applications from the physical data placement on the storage devices. Storage virtualization allows the processor to optimize physical data placement based on the characteristics of the storage devices and provides capacity reduction such as data deduplication and compression. User applications address a logical device by its Logical Unit Number (LUN). A logical data block associated with a logical device is identified by a logical block number (LBN). Thus, a complete logical address for a logical data block comprises the LUN of the logical device and the LBN of the logical data block. To support storage virtualization, the processor translates each user I/O request addressed to a LUN/LBN to a set of I/O requests addressed to storage device IDs and physical block numbers (PBNs). That is, the storage software translates the logical addresses of the logical data blocks into corresponding physical addresses for the physical data blocks stored on the data storage devices. In some storage software implementations, to perform this translation, the processor maintains forward map metadata that maps each data block's LBN to its PBN.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to one or more aspects of the present disclosure, methods for direct data placement are provided. The methods include: in view of a write request pertaining to a first object, determining, based on a first signature of the first object, whether an index of a storage system comprises an existing object record pertaining to the first object, wherein each of a plurality of entries of the index corresponds to a respective portion of a storage pool comprising a plurality of storage devices; and in response to determining that the index of the storage system does not include an existing object record pertaining to the first signature, creating a first object record in the index comprising the first signature and a reference count, wherein two or more of the plurality of entries of the index correspond to a plurality of hashes of the first signature, and wherein creating the first object record comprises: storing the first signature of the first object in a first entry of the plurality of the entries of the index corresponding to a first hash of the first signature.

In some embodiments, creating the first object record comprises: displacing a second object record stored in the first entry of the index, which further includes generating a second hash for a second signature associated with a second object using a second hash function; and inserting the second signature in a second entry of the index corresponding to the second hash. In some embodiments, the second object record includes the second signature.

In some embodiments, determining, based on the signature of the first object, whether the index of the storage system comprises the existing object record pertaining to the first object comprises: looking up a prefix of the first signature in prefix table of the storage system.

In some embodiments, determining, based on the signature of the first object, whether the index of the storage system comprises the existing object record pertaining to the first object includes: generating the plurality of hashes by processing the first signature using a plurality of hash functions in a predetermined order.

In some embodiments, the methods further include in response to determining that the index of the storage system includes an existing object record pertaining to the first signature, updating, by a processor, a reference count associated with the first object, wherein the exiting object record pertaining to the first signature comprises the reference count.

In some embodiments, updating the reference count includes incrementing the reference count.

In some embodiments, the signature of the first object is a hash of at least a portion of content of the first object.

According to one or more aspects of the present disclosure, systems for direct data placement are provided. The systems include: a memory; and a processor operatively coupled to the memory. The processor is configured to: in view of a write request pertaining to a first object, determine, based on a first signature of the first object, whether an index of a storage system comprises an existing object record pertaining to the first object; and in response to determining that the index of the storage system does not include an existing object record pertaining to the first signature, create a first object record in the index comprising the first signature and a reference count. Each of a plurality of entries of the index corresponds to a respective portion of a storage pool comprising a plurality of storage devices. In some embodiments, two or more plurality of entries of the index correspond to a plurality of hashes of the first signature. To create the first object record, the processor is further to store the first signature of the first object in a first entry of the plurality of the entries of the index corresponding to a first hash of the first signature.

In some embodiments, to create the first object record, the processor is further to: generate a second hash for a second signature associated with a second object using a second hash function; and insert the second signature in a second entry of the index corresponding to the second hash. In some embodiments, the second object record comprises the second signature;

In some embodiments, to determine, based on the signature of the first object, whether the index of the storage system comprises the existing object record pertaining to the first object, the processor is further to look up a prefix of the first signature in prefix table of the storage system.

In some embodiments, to determine, based on the signature of the first object, whether the index of the storage system comprises the existing object record pertaining to the first object, the processor is further to: generate the plurality of hashes by processing the first signature using a plurality of hash functions in a predetermined order.

In some embodiments, in response to determining that the index of the storage system includes an existing object record pertaining to the first signature, the processor is further to update a reference count associated with the first object, wherein the exiting object record pertaining to the first signature comprises the reference count.

According to one or more aspects of the present disclosure, a non-transitory machine-readable storage medium is provided. The non-transitory machine-readable storage medium includes instructions that, when accessed by a processor, cause the processor to: in view of a write request pertaining to a first object, determine, based on a first signature of the first object, whether an index of a storage system comprises an existing object record pertaining to the first object, wherein each of a plurality of entries of the index corresponds to a respective portion of a storage pool comprising a plurality of storage devices; and in response to determining that the index of the storage system does not include an existing object record pertaining to the first signature, create a first object record in the index comprising the first signature and a reference count, wherein two or more of the plurality of entries of the index correspond to a plurality of hashes of the first signature.

BRIEF DESCRIPTION OF THE DRAWINGS

The present disclosure is illustrated by way of example, and not by way of limitation, in the figures of the accompanying drawings, in which.

DETAILED DESCRIPTION

The present disclosure provides mechanisms (e.g., methods, systems, apparatuses, media, etc.) for direct data placement. The mechanisms may place data and objects on storage devices with a minimum of ancillary metadata structures and other overheads. As referred to herein, an object may include a unit of data stored in a storage system. In some embodiments, the object may be an opaque binary blob (binary large object) of a certain length. In some embodiments, the object may be of a fixed length.

There are many storage architectures where the storage may be visible to all nodes, such as two node failover designs, a farm of FLASH devices sitting on a PCIe fabric, etc. In these shared everything designs, as servers access storage, there needs to be some form of distributed coordination so that two servers do not write to the same location at the same time. For example, SCSI (Small Computer System Interface) reservations are used to address this issue in a SCSI fabric. However, SCSI reservations only provide a coarse-grained solution and can quickly result in servers waiting on locks. Locking can be achieved using distributed locking over TCP/IP, devices-based locking (e.g., SCSI locks), PCIe based locking, fabric specific locking, etc. Depending on interconnect technologies and topology, a classic dual controller design can be made more efficient wherein each controller sees all the storage, can write and/or read all the storage (subject to the locking mechanism described above), without the need to mirror state between the two controllers.

The direct data displacement mechanisms described herein may allow multiple servers to share the storage without sending data between servers or partitioning the storage for each server. The mechanisms may be utilized to place data on a random-access device in a shared-storage object store such that normal bitmaps and other allocation data structures are not needed.

According to one or more aspects of the present disclosure, a storage system may include a plurality of storage devices storing objects. Each of the objects may be associated with a signature unique to its content. The signature may be generated using a collision resistant hash (e.g., SHA1). The objects with the same signature have identical content. Objects with different signatures have different content.

The storage system may be associated with an index including a plurality of entries (e.g., slots) corresponding to a plurality of portions of the storage devices. A respective entry of the index may correspond to a respective portion of the storage devices (e.g., a physical block). As such, the entries of the index and the portions of the storage devices may have a one-to-one correspondence relationship. For example, each respective object record in the index may correspond to a portion of the storage devices (e.g., one or more physical data blocks).

The index may store one or more object records. Each of the object records may include information about an object, such as a signature of the object, a physical location of the object stored in the storage devices (e.g., a physical block number (PBN) identifying a physical data block storing the object), a reference number, etc. In some embodiments, the first object record does not include the PBN.

A user application may determine the physical location of the object by querying the index by the object's signature. The index may be updated to keep track to the updated physical location of the object on the media. The user application does not directly allocate space on the storage device. To fulfill a write request pertaining to the object, if an object record of the object already exists in the index, the reference count may be incremented. If the index does not include an existing object record of the object, a new object record may be created for the object utilizing a displacement hashing algorithm that may resolve hash collisions of values of hash functions in a hash table. Accordingly, a portion of the storage devices may be allocated to an object by allocating a slot of the index (e.g., an entry of the index) corresponding to the portion of the storage devices to the object record of the object.

Compressing an object may result in a variable length data structure. In many storage systems, these compressed variable length objects are packed into a fixed length container, which is then written out. Even when the fixed length objects are not compressed, they may still be containerized to facilitate certain write optimizations. In both cases, as those objects go out of scope, the space in the container is lost to the system until a garbage collection process reads the container, keeps all the in-scope objects, and writes out a new container. This may result in significant write-amplification and may reduce write performance in some situations if not managed properly. The direct placement techniques described herein has no garbage collection, and therefore no write-amplification.

Of course, the present invention is not limited to the features, advantages, and contexts summarized above, and those familiar with storage technologies will recognize additional features and advantages upon reading the following detailed description and upon viewing the accompanying drawings. For purposes of this disclosure, similar elements are identified by similar numeric reference numbers. A numeric reference number followed by a lowercase letter refers to a specific instance of the element.

Figure 1:
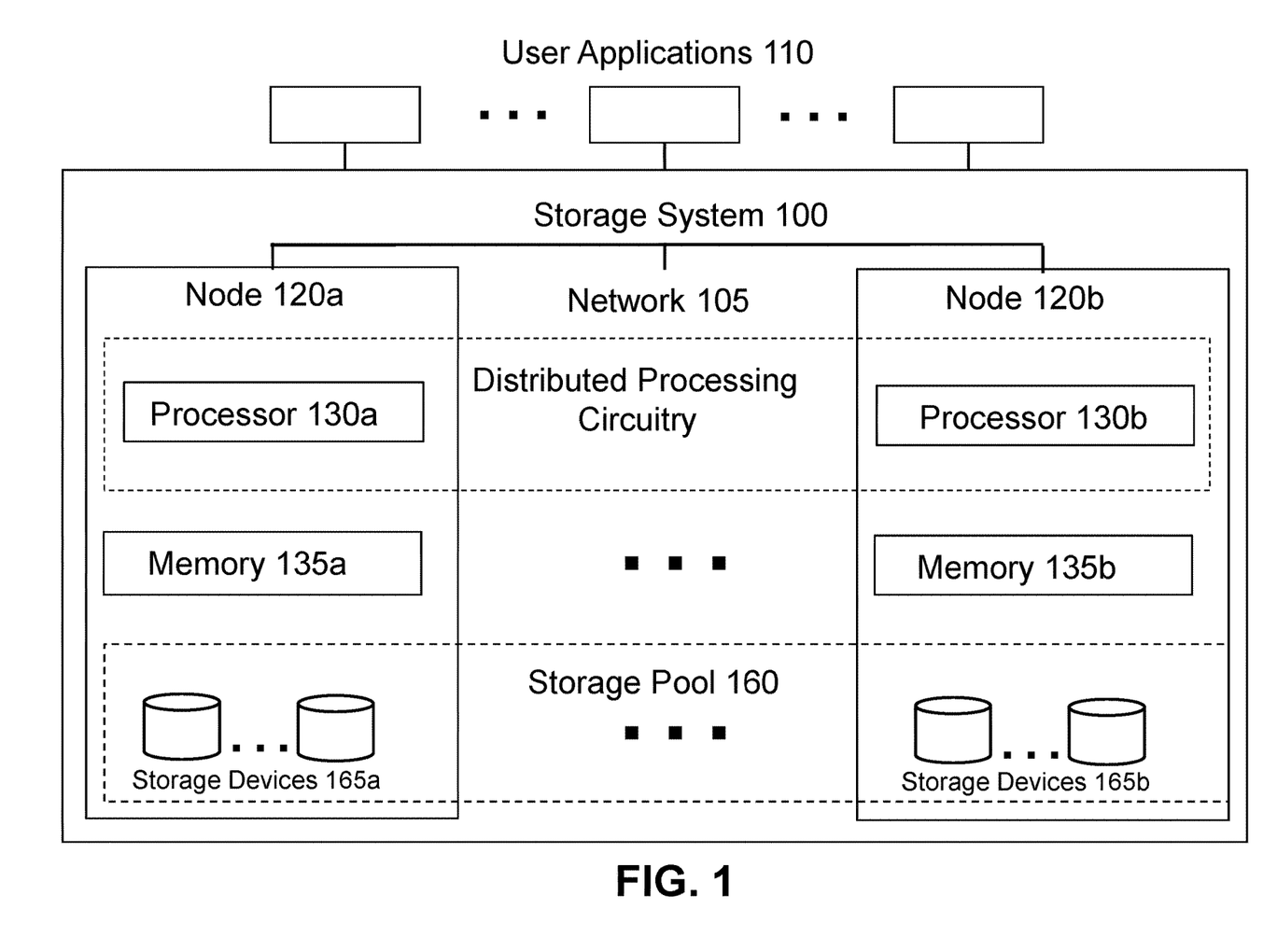
FIG. 1 is a block diagram illustrating an example of a storage system in accordance with some implementations of the present disclosure.

FIG. 1 is a block diagram illustrating an example 100 of a storage system in accordance with some implementations of the present disclosure. The storage system 100 may include one or more nodes 120 connected by a network 105. In an implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long-Term Evolution (LTE) network), routers, hubs, switches, server computers, the like, and/or a combination thereof.

In some embodiments, a node 120 may include a processor 130, a memory 135, and one or more storage devices 165. The processor 130 may include a microprocessor, microcontroller, digital signal processor, hardware circuit, firmware, the like, or a combination thereof. The processors 130 at each node 120 may collectively form a distributed processing circuitry that may control the storage system. Memory 135 may include volatile and/or non-volatile memory for locally storing information and data used by the node. The storage devices 165 at different nodes 120 within the storage system 100 may collectively form a shared data storage pool 160. Examples of storage devices 165 include solid-state devices (SSDs), hard disk drives (HDDs), and a combination of SSDs and HDDs (Hybrid). Each node may be and/or include a computer system 600 as described in connection with FIG. 6. Each processor 130 may be and/or include a processing device 602 of FIG. 6.

In some embodiments, the storage devices 165 may be configured under a RAID system for data redundancy and load balancing. Examples of the RAID system may include software RAID, hardware RAID card, RAID on a chip, Erasure Coding, or JBOD (Just a Bunch of Disks). The storage devices 165 may also include a non-volatile random-access memory (NVRAM) device for write caching and deferred writes. Examples of NVRAM devices include NVRAM cards, battery-backed dynamic random-access memory (DRAM), and non-volatile dual in-line memory module (NVDIMM). In some implementations, the storage devices 165 may be accessible by multiple nodes 120 or multiple storage systems 100 as shared storage devices.

The storage system 100 may provide logical device access to one or more user applications 110. In some implementations, the user application 110 and the storage system 100 may be running on the same physical systems. In other implementations the user application 110 may access the storage system 100 through a storage network such as Ethernet, Fibre Channel, InfiniBand, and PCIe networks.

The processors 130 provide an interface between the user applications 110 and the storage devices 165. For example, the processors 130 may provide a set of commands for the application 110 to read from and write to the storage devices 165 in the storage pool 160. The processors 130 run storage software applications to provide storage virtualization, capacity reduction, scale out, availability, mobility, and performance that often cannot be achieved by the storage devices themselves.

Processor(s) 130 may maintain an index for the storage system 100 and/or the storage pool 160. The index may include a plurality of object records. Each of the object records may correspond to a respective object stored in the storage pool 160. In some embodiments, there is a one-to-one correspondence between the object records of the index and the objects stored in storage devices 165 and/or the storage pool 160. Each of the object records may be an entry of the index that may include a signature of an object, a physical address of one or more portions of the storage devices 165 that store the object, a reference count, and/or any other suitable information relating to the object. The signature may be a hash generated based on the content of the object and/or one or more portions of the content of the object. The physical address may be and/or include a physical block number (PBN) identifying a physical data block storing the applications and/or instances initiated by the applications referencing the signature and/or the object. As will be described in greater detail below, the index may be generated utilizing a plurality of hash functions. In one implementation, the index is generated utilizing at least three hash functions. In another implementation, the index is generated utilizing two hash functions. The index may include one or more hash tables generated utilizing the plurality of hash functions.

Each entry of the index may correspond to a portion of storage devices 165 (e.g., one or more physical data blocks). As such, there is a one-to-one correspondence between a respective entry of the index and a respective portion of storage devices 165. Accordingly, a portion of the storage devices 165 may be allocated to an object by allocating a slot of the index (e.g., an entry of the index) corresponding to the portion of the storage nodes to the object record of the object. If the slot in the index becomes free (e.g., not allocated to any object), the corresponding location on the storage nodes is available for allocation to a new object as well. In order to move an entry of the index, the object stored in the portion of storage devices 165 corresponding to the entry of the index may also need to be moved. In some embodiments, the index of the storage system 100 may include an index 200 as described in connection with FIGS. 2A-2C.

In some embodiments, the index may include a plurality of buckets. Each of the buckets may store a plurality of object records. In some embodiments, the object records may be stored in a bucket in an arbitrary order. As such, inserting a new object record in the bucket does not have to involve moving back end objects. In one implementation, a bucket may include a plurality of slots of the index. Using suitable buckets to store object records may lead to more deterministic results for the direct data displacement mechanisms described herein. For example, the index may be generated utilizing two or three hash functions. A bucket of the index may hold more than 16 object records. One displacement may be sufficient to create a new object record.

A user application 110 system may determine where an object resides by querying the index by the object's signature. When an object is written, user application 110 may enter the signature in the index, and the index may keep track of where on the storage devices the object resides. The user applications 110 do not directly allocate space on the media.

To perform a write operation pertaining to an object, a reference count may be incremented in some embodiments in which an existing object record in the index comprises a signature of the object. In some embodiments, a user application 110 may send, to one or more processors 130, a request for performing a dereference operation with respect to one or more objects. For example, the user application 110 may send the request in response to determining that an object is out of scope. Upon receiving the request, processor(s) 130 may look up the existing object record by the object's signature and may decrement the reference count associated with the object. Many user application instances may have multiple references to the same object. The user application instances may be independent of each other and do not coordinate amongst themselves with respect to reference counts. When the reference count is set to 0, the object is no longer referenced by any user application. As a result, the slot in the index that was occupied by the object and the portion of the storage pool 160 used to store the object become available for a new object.

Accordingly, physical storage space may be allocated to objects by allocating entries in the index of the storage system 100. There is no garbage collection in the storage system, and therefore there is no garbage collection induced write-amplification. CRUD (create, read, update, delete) operations on the index may be amortized O(1) in cost. The direct data displacement techniques described herein may also enable little or no data movement in the storage system while performing the operations on the index.

Figure 2A:
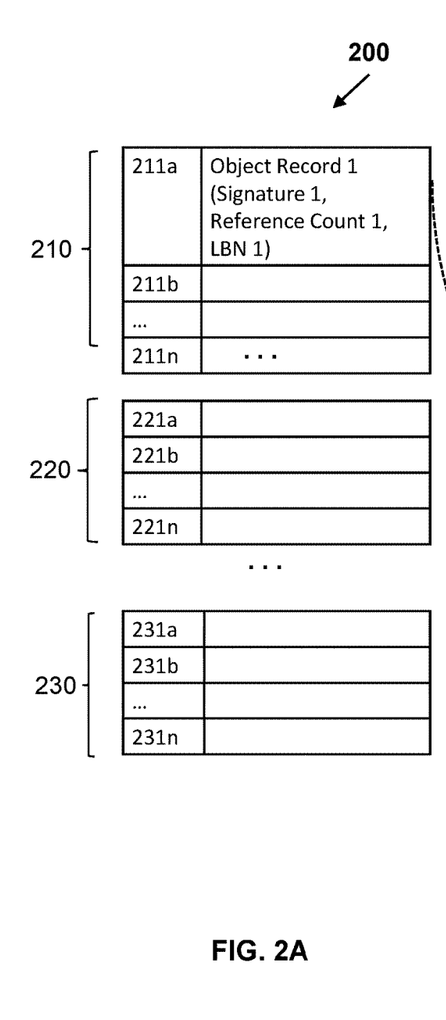
FIGS. 2A, 2B, and 2C are schematic diagrams illustrating an example index in accordance with some implementations of the present disclosure.

FIG. 2 is a schematic diagram illustrating an example 200 of an index of an object store in accordance with some embodiments of the present disclosure.

As illustrate, a first portion 210 of index 200 may include a plurality of entries 211*a*, 211*b*, . . . , 211*n*. A second portion 220 of index 200 may include a plurality of entries 221*a*, 221*b*, . . . , 221*n*. A third portion 230 of index 200 may include a plurality of entries 231*a*, 231*b*, . . . , 231*n*. Each of entries 211*a*-*n*, 221*a*-*n*, and 231*a*-*n* may be allocated to a respective object to store an object record of the object. The object record may include, for example, a signature of an object, a physical address identifying a portion of one or more storage devices storing the object, and a reference count. In some embodiments, the object record does not include the physical address. In some embodiments, the index 200 may be implemented using one hash table. In some embodiments, each portion of index 200 may be implemented as an independent hash table.

Each of entries 211*a*, 211*b*, . . . , 211*n* may correspond to a hash generated using a first hash function. Each of entries 221*a*, 221*b*, . . . , 221*n* may correspond to a hash generated using a second hash function. Each of entries 231*a*, 231*b*, . . . , 231*n* may correspond to a hash generated using a third hash function. The first hash function, the second hash function, and the third hash function may be different. As such, processing a given signature of an object using the first hash function, the second hash function, and the third hash function, respectively, may produce three different values corresponding to three entries of index 200 (e.g., an entry in the first portion 210, an entry in the second portion 220, an entry in the third portion 230). While three portions of the index 200 are depicted in FIG. 2A, this is merely illustrative. The index 200 may have any suitable number of portions, wherein each of the portions corresponds to a respective hash function.

The index 200 may be generated utilizing a displacement hashing algorithm that may resolve hash collisions of values of hash functions in a hash table. For example, to write a first object with a first signature with no existing entry in the index, a processor (e.g., processor 130 of FIG. 1) may process the first signature using the first hash function to generate a first hash. The processor may then determine whether the entry of the index 200 corresponding to the first hash (e.g., entry 221*a*) is occupied. If the entry is not occupied, the processor may allocate entry 221*a* to the first object and create a first object record for the first object. As illustrated in FIG. 2A, the first object record may include the first signature, a first reference count, and a first physical address. After creating the first object record, the processor may receive a write request pertaining to the first object from a user application. The processor may increment the value of the first reference count in view of the write request.

Figure 2B:
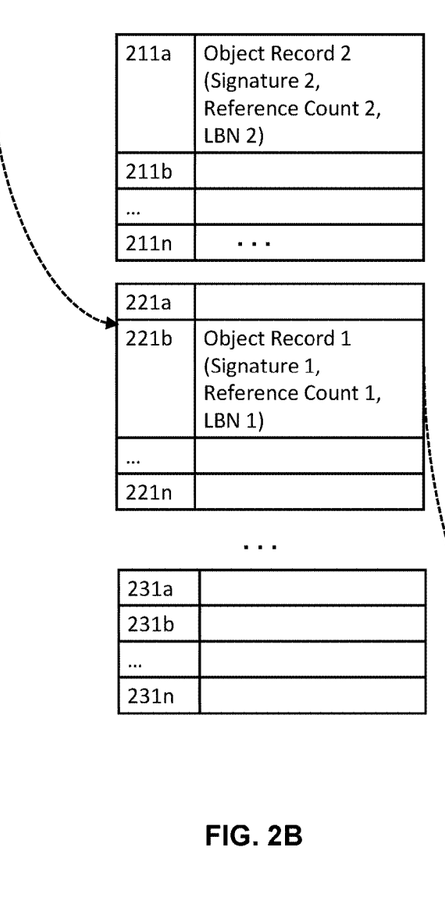
Figure 2C:
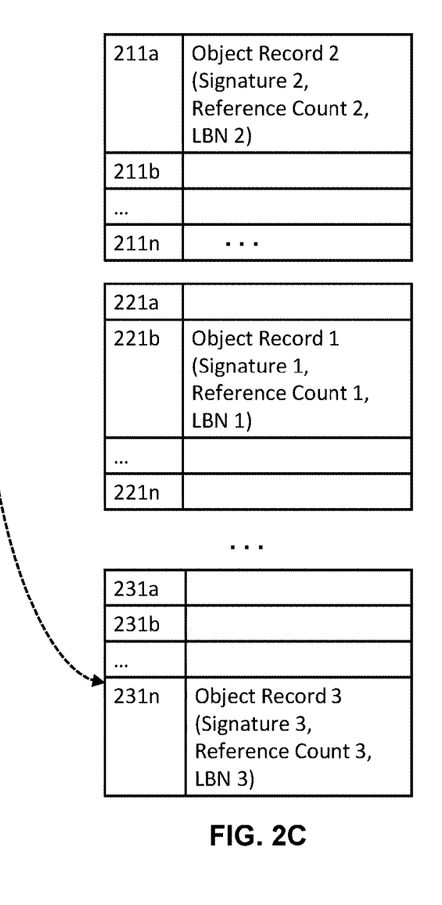

In some embodiments, processing different signatures of different objects using a given hash function may produce the same hash. For example, processing a second signature of a second object using the first function may also produce the first hash. To allocate an entry of the index 200 to the second object, the processor may determine that entry 211*a* corresponds to the first hash and that entry 211*a* is occupied. The processor may displace the first object record stored in entry 211*a* and may insert a second object record in entry 211*a*. The second object record may include the second signature, a second reference count, a second physical address. To displace the first object record, the processor may generate a second hash by processing the second signature using the second hash function. The second hash may correspond to an entry of the second portion of the index 200, such as entry 221*b*. The processor may then determine whether entry 221*b* is occupied. If entry 221*b* is not occupied, the processor may insert the first object record in entry 221*b* as illustrated in FIG. 2B. If entry 221*b* is occupied is occupied by a third object record, the processor may displace the third object record and insert the first object record in entry 221*b* as illustrated in FIG. 2C. For example, the processor may process a third signature in the third object record using the third hash function to produce a third hash. The processor may then insert the third object record in an entry in the third portion of the index 200, such as 231*n*.

Figure 3:
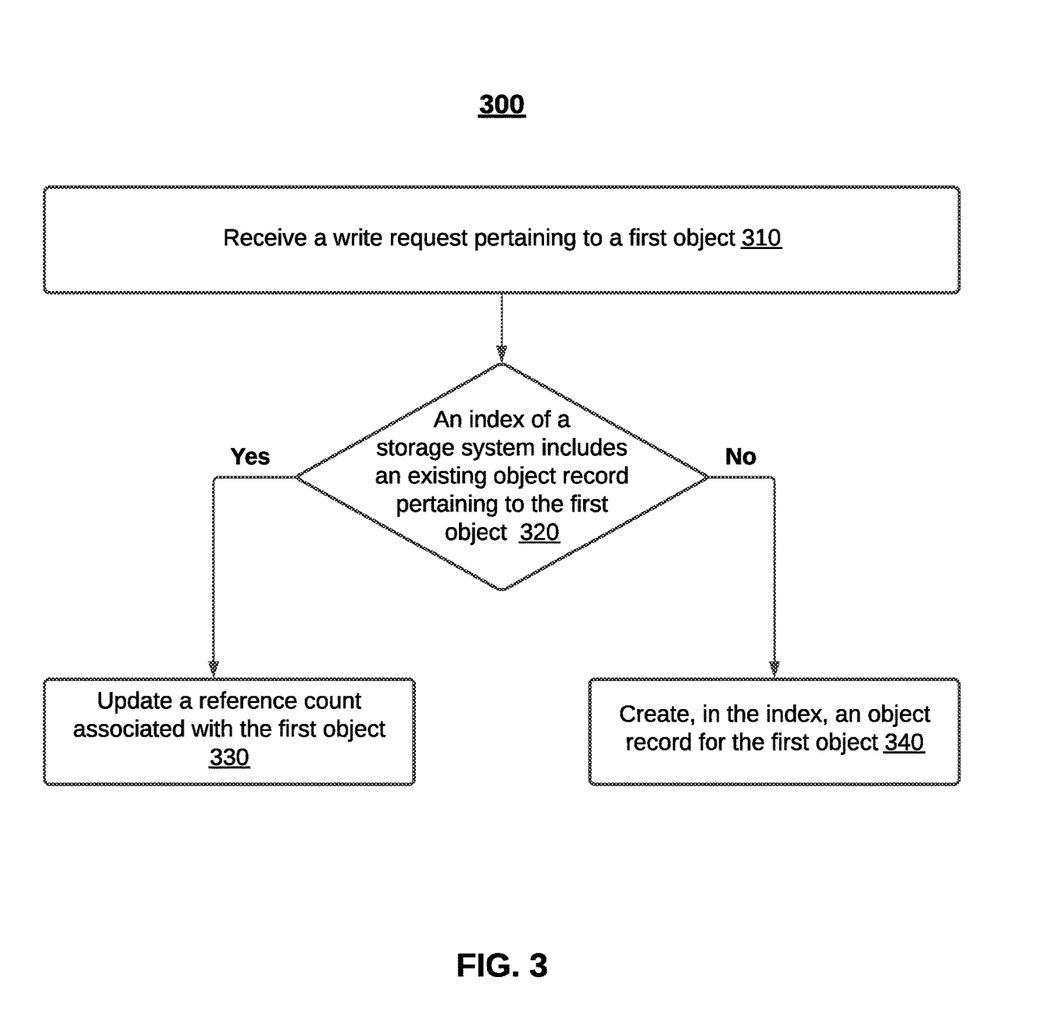
FIG. 3 is a flow diagram illustrating an example of a method of performing a write operation pertaining an object in accordance with the disclosure.

FIG. 3 is a flow diagram illustrating an example 300 of a process for performing a write operation pertaining to an object in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

At block 310, the processor may receive a write request pertaining to a first object. The first object may be associated with a first signature representative of the content of the first object and/or one or more portions of the content of the first object. The first signature may be a hash of the content of the first object and/or the portions of the content of the first object.

At block 320, in view of the write request, the processor may determine whether an index of a storage system includes an existing object record pertaining to the first object. For example, the processor may look up the first signature in the index to determine if any existing entry of the index includes the first signature. More particular, for example, the processor may generate one or more hashes of the first signature using a plurality of hash functions corresponding to the index in a predetermined order. The hashes may correspond to a plurality of entries of the index. The processor may further determine if any of the entries include the first signature. In some embodiments, the processor may generate a first hash of the first signature using a first hash function and determine if a first entry of the index corresponding to the first hash comprises the first signature. In response to determining that the first entry includes the first signature, the processor may determine that an existing entry of the index corresponds to the first signature. If the first entry does not include the first signature, the processor may generate a second hash of the first signature using a second hash function of the plurality of hash functions. The processor may then determine whether a second entry of the index corresponding to the second hash includes the first signature. As such, the first hash function and the second hash function are used in a predetermined order.

In some embodiments, the processor may look up a prefix of the first signature in a prefix table associated with the index and/or the object store to determine if any existing entry of the prefix table contains the prefix of the first signature. If the processor determines that there is more than one existing entry of the prefix table containing the prefix of the first signature, the processor may then look up the first signature in the index as described above. In one implementation, the prefix table is part of the index of the object store. In another implementation, the prefix table is not part of the index of the object store.

In response to determining that the index includes an existing object record pertaining to the first signature, the processor may update a reference count associated with the first object at block 330 (e.g., by incrementing the reference count). The reference count may be stored in the exiting object record.

In some embodiments in which the index does not include an existing object record pertaining to the first object, the processor may create, in the index, an object record for the first object at block 340. For example, the processor may create the object record using a displacement hashing algorithm that may resolve hash collisions of values of hash functions in a hash table. In some embodiments, creating the entry may involve performing one or more operations as described in connect with FIG. 4 below.

Figure 4:
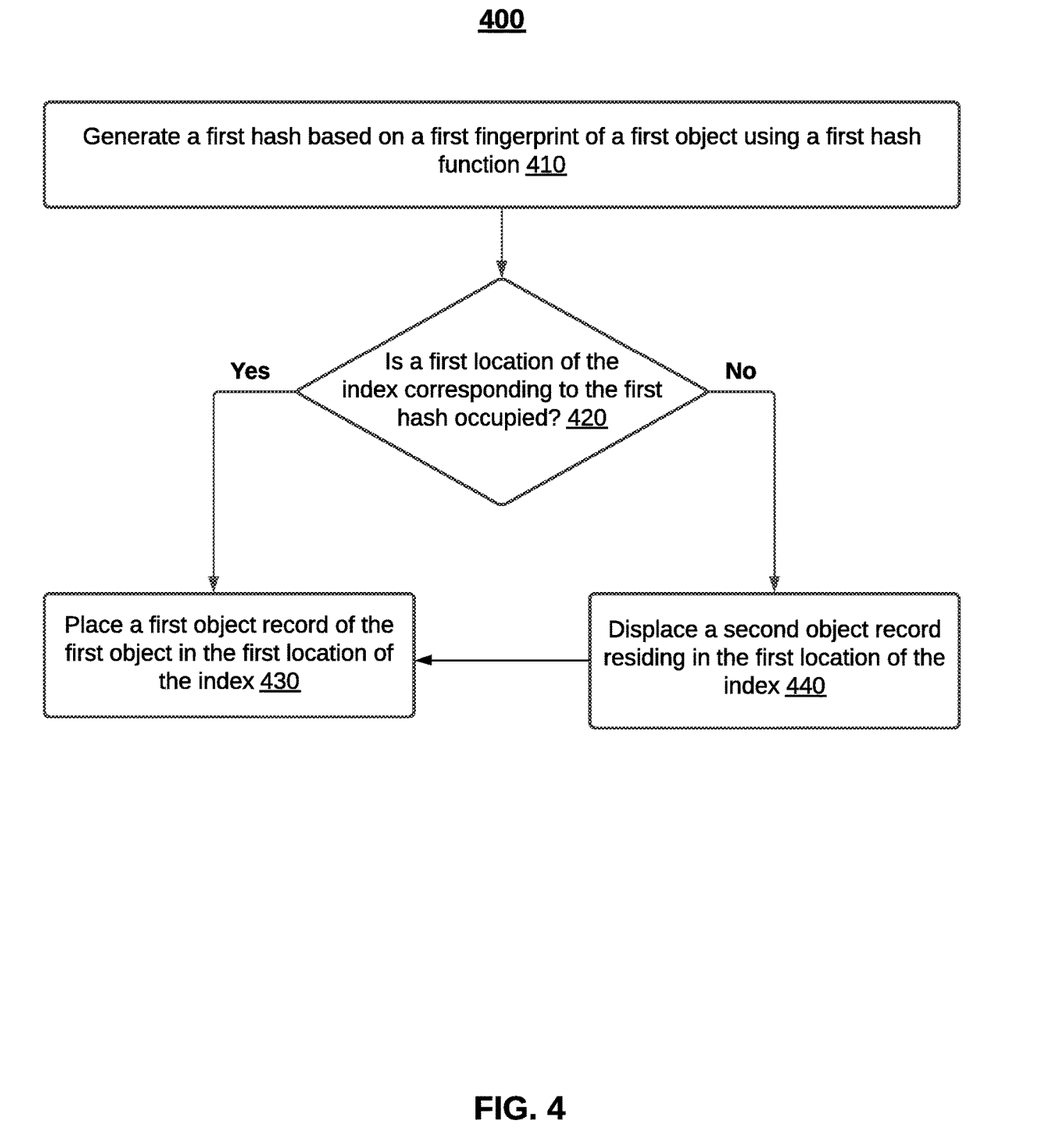
FIG. 4 is a flow diagram illustrating an example of a method of creating a new object record in accordance with some embodiments of the disclosure.

FIG. 4 is a flow diagram illustrating an example 400 of a process of creating a new object in accordance with some embodiments of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

At block 410, the processor may generate a first hash based on a first signature of a first object using a first hash function. The first signature may indicate the content of the first object. In some embodiments, the first signature may be generated by processing the content of the first object using a suitable hash function (e.g., SHA1). In some embodiments, generating the first hash may involve extracting one or more first bytes from the first signature (e.g., the first N bytes of the first signature).

At block 420, the processor may determine whether a first location of the index corresponding to the first hash is occupied. The first location may be an entry (e.g., a slot) of the index including the first hash. In response to determining that no object resides in the first location of the index, the processor may insert the first object record in the first entry of the index at 430. The first object record may include the first signature, a first reference count, a first physical address identifying a portion of the storage system that stores the first object, etc.

In response to determining that the first location of the index is occupied, for example, by determining that a second object record of a second object resides in the first location of the index, the processor may proceed to block 440. The second object record may include a second signature of the second object, a second reference count, etc. At block 440, the processor may displace the second object record. The processor may also place the first object record of the first object in the first location of the index. In some embodiments, displaying the second object record may involve performing one or more operations as described in connection with FIG. 5 below.

Figure 5:
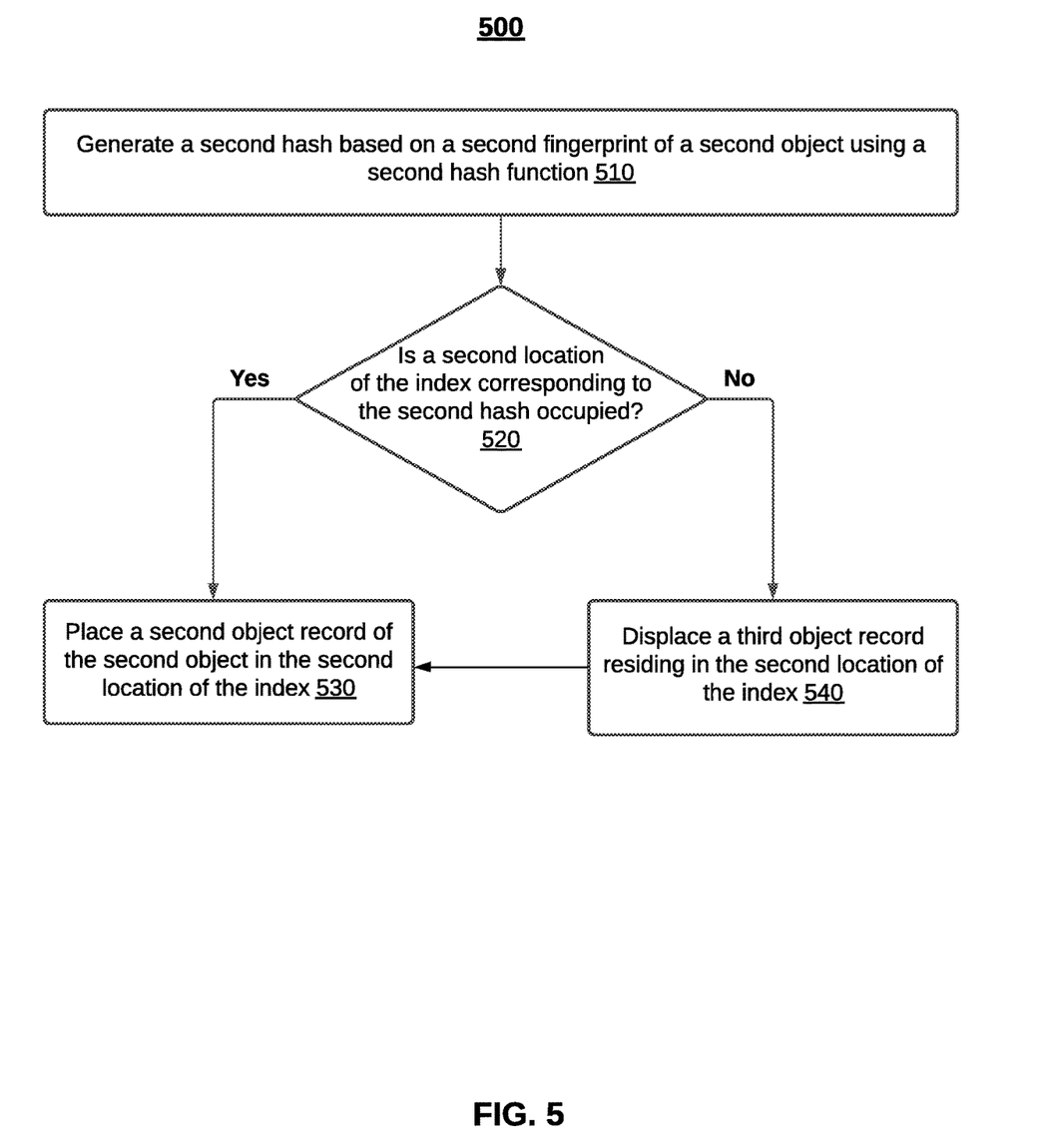
FIG. 5 is a flow diagram illustrating an example of a method of displacing an object record in accordance with some embodiments of the disclosure.

FIG. 5 is a flow diagram illustrating an example 500 of a process of displacing an object record in accordance with some embodiments of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof.

At block 510, the processor may generate a second hash based on the second signature of the second object using a second hash function. Generating the second hash may involve, for example, extracting one or more second bytes from the second signature (e.g., M bytes of the second signature).

At block 520, the processor may determine whether a second location of the index corresponding to the second hash is occupied. In response to determining the second location of the index is not occupied, the processor may proceed to block 530 and may place the second object record in the second location of the index. In response to determining that the second location of the index is occupied by a third object record, the processor may displace the third object record at block 540. The processor may further place the second object record in the second location of the index.

Figure 6:
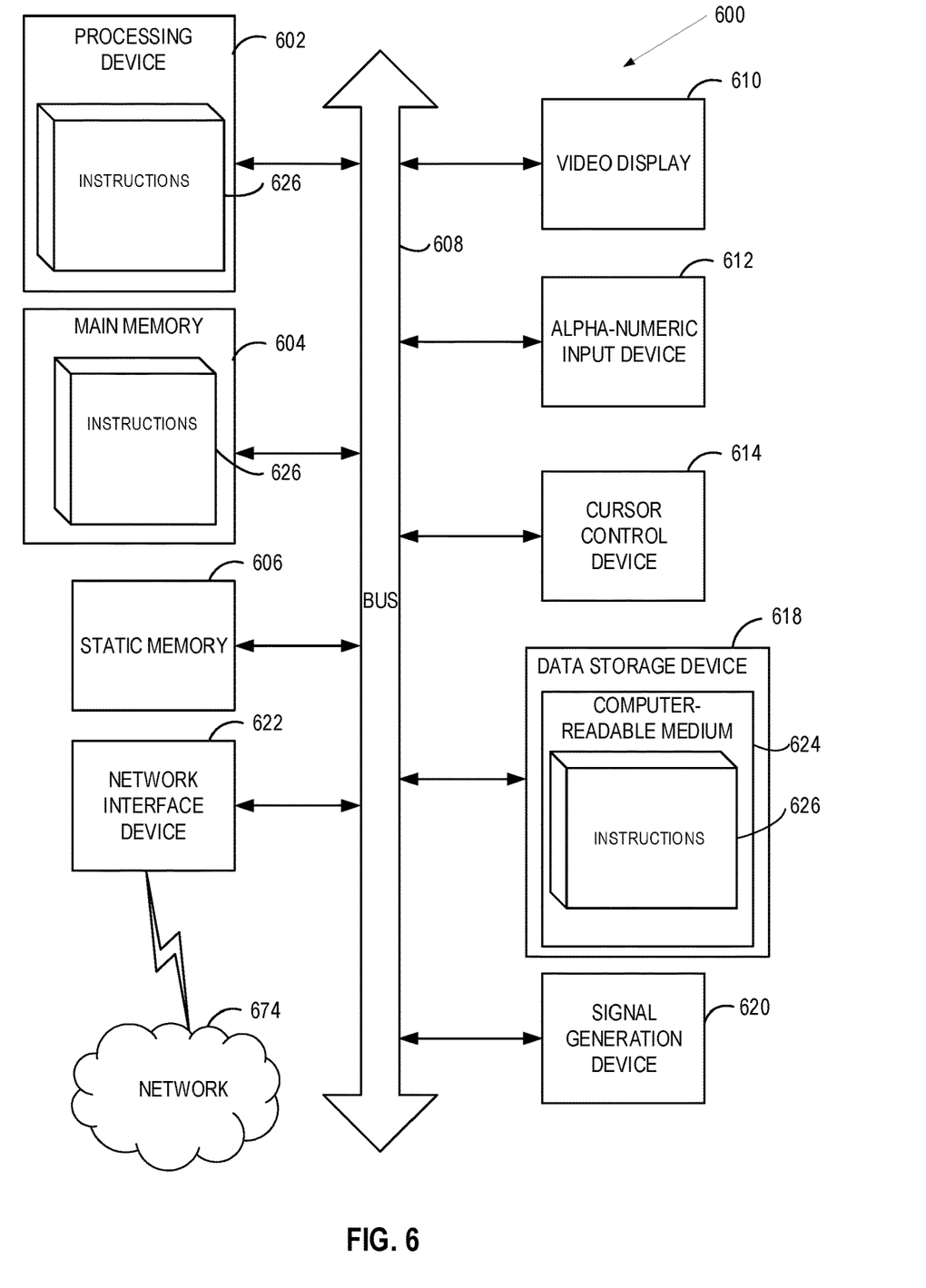
FIG. 6 is a block diagram illustrating an example of a computer system in accordance with some embodiments of the disclosure.

FIG. 6 illustrates a block diagram of an illustrative computing device operating, in accordance with the examples of the disclosure. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random-access memory (DRAM) (such as synchronous DRAM (SDRAM) or RDRAM, etc.), a static memory 606 (e.g., flash memory, static random-access memory (SRAM), etc.), and a data storage device 618, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the instructions 626 for performing the operations and steps discussed herein.

In accordance with one or more aspects of the present disclosure, processing device 602 may be configured to execute instructions 626 to cache 628 for implementing methods 300, 400, and 500 in accordance with various embodiments of the present disclosure.

The computer system 600 may further include a network interface device 622 communicably coupled to a network 674. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a non-transitory computer-readable storage medium 624 on which is stored instructions 626 embodying any one or more of the methodologies of functions described herein. The instructions 626 may also reside, completely or at least partially, within the main memory 604 as instructions 626 and/or within the processing device 602 as instructions 626 during execution thereof by the computer system 600; the main memory 604 and the processing device 602 also constituting machine-accessible storage media.

The non-transitory computer-readable storage medium 624 may also be used to store instructions 626 to implement any one or more of the methodologies of functions described herein in a computer system, such as the system described with respect to FIGS. 1-5, and/or a software library containing methods that call the above applications.

While the non-transitory computer-readable storage medium 624 is shown in an example implementation to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing, encoding or carrying a set of instruction for execution by the machine and that cause the machine to perform any one or more of the methodologies of the disclosure. The term "non-transitory computer-readable storage medium" shall accordingly be taken to include, but not be limited to, solid-state memories, and optical and magnetic media.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

In the foregoing description, numerous details are set forth. It may be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "storing," "generating," "determining," "sending," "updating," "incrementing," "maintaining," "identifying," "associating," "hashing," "referencing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems may appear as set forth in the description below. In addition, the disclosure is not described with reference to any particular programming language. It may be appreciated that a variety of programming languages may be used to implement the teachings of the disclosure as described herein.

The disclosure may be provided as a computer program product, or software, that may include a machine-readable storage medium having stored thereon instructions, which may be used to program a computer system (or other electronic devices) to perform a process according to the disclosure. A machine-readable storage medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

For purposes of this disclosure, any element mentioned in the singular also includes the plural.

Although some figures depict lines with arrows to represent intra-network or inter-network communication, in other implementations, additional arrows may be included to represent communication. Therefore, the arrows depicted by the figures do not limit the disclosure to one-directional or bi-directional communication.

Whereas many alterations and modifications of the disclosure may no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

What is claimed is:

1. A method, comprising:
   n view of a write request pertaining to a first object, determining, based on a first signature of the first object, whether an index of a storage system comprises an existing object record pertaining to the first object, wherein each of a plurality of entries of the index corresponds to a respective portion of a storage pool comprising a plurality of storage devices; and
   in response to determining that the index of the storage system does not include an existing object record pertaining to the first signature, creating a first object record in the index, wherein the first object record comprises the first signature and a reference count, wherein two or more of the plurality of entries of the index correspond to a plurality of hashes of the first signature, and wherein creating the first object record comprises:
      placing the first signature of the first object in a first entry of the plurality of the entries of the index corresponding to a first hash of the first signature;
   in response to determining that the index of the storage system includes an existing object record pertaining to the first signature, updating, by a processor, a reference count associated with the first object, wherein the exiting object record pertaining to the first signature comprises the reference count associated with the first object.

2. The method of claim 1, wherein creating the first object record comprises:
   displacing a second object record stored in the first entry of the index, comprising:
      generating a second hash for a second signature associated with a second object using a second hash function, wherein the second object record comprises the second signature; and
      inserting the second signature in a second entry of the index corresponding to the second hash.

3. The method of claim 1, wherein determining, based on the first signature of the first object, whether the index of the storage system comprises the existing object record pertaining to the first object comprises:
   looking up a prefix of the first signature in prefix table of the storage system.

4. The method of claim 1, wherein determining, based on the first signature of the first object, whether the index of the storage system comprises an existing object record pertaining to the first object comprises:
   generating the plurality of hashes by processing the first signature using a plurality of hash functions in a predetermined order.

5. The method of claim 1, wherein updating the reference count comprises incrementing the reference count associated with the first object.

6. The method of claim 1, wherein the first signature of the first object is a hash of at least a portion of content of the first object.

7. A system comprising:
   a memory; and
   a processor operatively coupled to the memory, the processor to:
      in view of a write request pertaining to a first object, determine, based on a first signature of the first object, whether an index of a storage system comprises an existing object record pertaining to the first object, wherein each of a plurality of entries of the index corresponds to a respective portion of a storage pool comprising a plurality of storage devices; and
      in response to determining that the index of the storage system does not include an existing object record pertaining to the first signature, create a first object record in the index comprising the first signature and a reference count, wherein two or more of the plurality of entries of the index correspond to a plurality of hashes of the first signature, and wherein, to create the first object record, the processor is further to:

store the first signature of the first object in a first entry of the plurality of the entries of the index corresponding to a first hash of the first signature;

wherein the processor is further to: in response to determining that the index of the storage system includes an existing object record pertaining to the first signature, update a reference count associated with the first object, wherein the exiting object record pertaining to the first signature comprises the reference count associated with the first object.

8. The system of claim 7, wherein, to create the first object record, the processor is further to:

generate a second hash for a second signature associated with a second object using a second hash function, wherein the second object record comprises the second signature; and insert the second signature in a second entry of the index corresponding to the second hash.

9. The system of claim 7, wherein, to determine, based on the first signature of the first object, whether the index of the storage system comprises an existing object record pertaining to the first object, the processor is further to:

look up a prefix of the first signature in prefix table of the storage system.

10. The system of claim 7, wherein, to determine, based on the first signature of the first object, whether the index of the storage system comprises the existing object record pertaining to the first object, the processor is further to:

generate the plurality of hashes by processing the first signature using a plurality of hash functions in a predetermined order.

11. The system of claim 7, wherein, to update the reference count, the processor is further to increment the reference count associated with the first object.

12. The system of claim 11, wherein the signature of the first object is a hash of at least a portion of content of the first object.

13. A non-transitory machine-readable storage medium including instructions that, when accessed by a processor, cause the processor to:

in view of a write request pertaining to a first object, determine, based on a first signature of the first object, whether an index of a storage system comprises an existing object record pertaining to the first object, wherein each of a plurality of entries of the index corresponds to a respective portion of a storage pool comprising a plurality of storage devices; and in response to determining that the index of the storage system does not include an existing object record pertaining to the first signature, create a first object record in the index comprising the first signature and a reference count, wherein two or more of the plurality of entries of the index correspond to a plurality of hashes of the first signature, and wherein, to create the first object record, the processor is further to:

store the first signature of the first object in a first entry of the plurality of the entries of the index corresponding to a first hash of the first signature, wherein the first signature of the first object is a hash of at least a portion of content of the first object;

in response to determining that the index of the storage system includes an existing object record pertaining to the first signature, update a reference count associated with the first object, wherein the exiting object record pertaining to the first signature comprises the reference count.

14. The non-transitory machine-readable storage medium of claim 13, wherein, to create the first object record, the processor is further to:

generate a second hash for a second signature associated with a second object using a second hash function, wherein the second object record comprises the second signature; and insert the second signature in a second entry of the index corresponding to the second hash.

15. The non-transitory machine-readable storage medium of claim 13, wherein, to determine, based on the first signature of the first object, whether the index of the storage system comprises an existing object record pertaining to the first object, the processor is further to:

look up a prefix of the first signature in prefix table of the storage system.

16. The non-transitory machine-readable storage medium of claim 13, wherein, to determine, based on the first signature of the first object, whether the index of the storage system comprises an existing object record pertaining to the first object, the processor is further to:

generate the plurality of hashes by processing the first signature using a plurality of hash functions in a predetermined order.

17. The non-transitory machine-readable storage medium of claim 13, wherein updating the reference count comprises incrementing the reference count associated with the first object.

* * * * *